Figure 1:
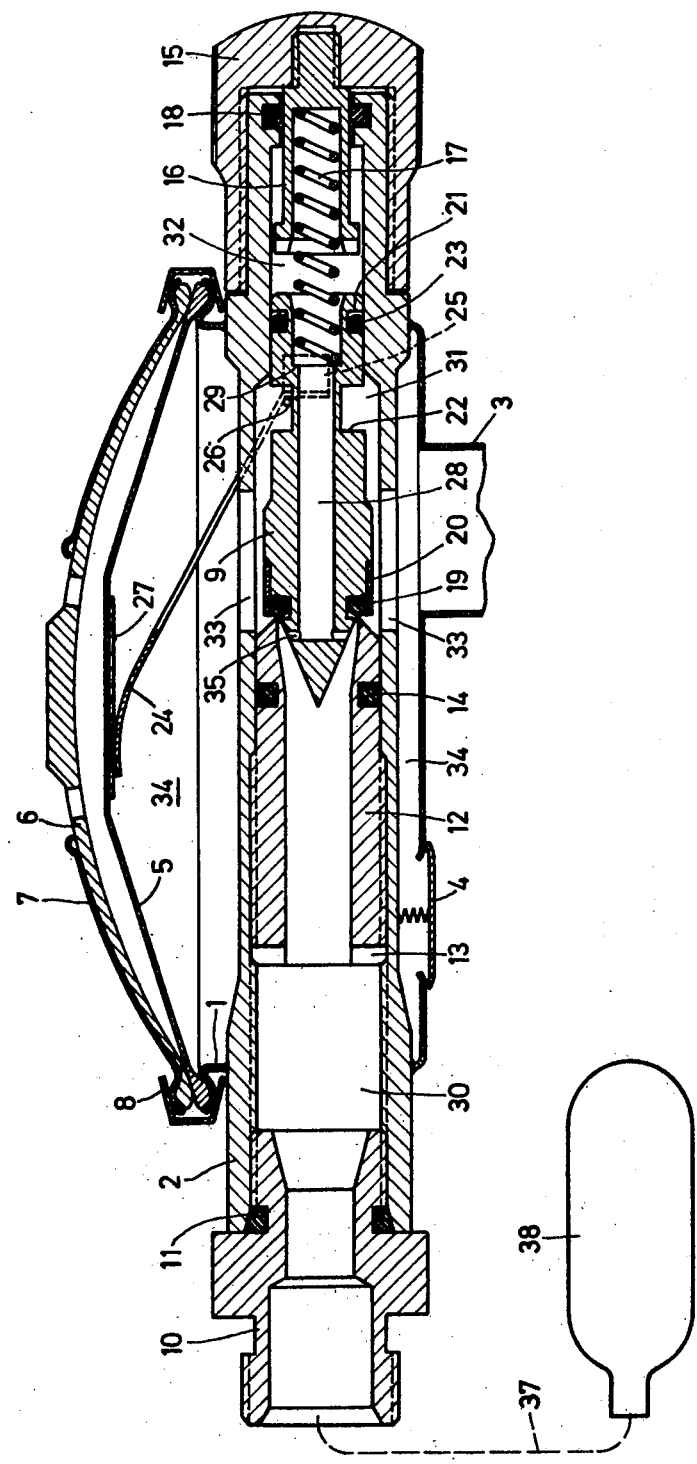

United States Patent [19]

Leemann

[11] 4,041,978
[45] Aug. 16, 1977

[54] PRESSURE REGULATOR FOR BREATHING APPARATUS

[75] Inventor: Karl Leemann, Zurich, Switzerland

[73] Assignee: Scubapro EU, Zurich, Switzerland

[21] Appl. No.: 648,717

[22] Filed: Jan. 13, 1976

[30] Foreign Application Priority Data

Jan. 20, 1975 Switzerland .................. 625/75

[51] Int. Cl.² ................................. F16K 31/38
[52] U.S. Cl. ..................... 137/494; 128/142.2
[58] Field of Search ............... 137/494, DIG. 9; 128/142.2

[56] References Cited

U.S. PATENT DOCUMENTS

| 3,329,158 | 7/1967 | Geiszler | 137/DIG. 9 |
| 3,498,312 | 3/1970 | Geiszler | 137/494 X |
| 3,522,818 | 8/1970 | Suchy | 137/494 |
| 3,529,803 | 9/1970 | Schell | 137/494 X |
| 3,626,975 | 12/1971 | Bobst | 137/494 X |
| 3,783,891 | 1/1974 | Christianson | 137/494 X |

Primary Examiner—Harold W. Weakley
Attorney, Agent, or Firm—Oblon, Fisher, Spivak, McClelland & Maier

[57] ABSTRACT

A pressure regulator for divers' breathing apparatus having a diaphragm case and a diaphragm disposed therein. As a function of the pressure which exists in a space delimited by the diaphragm and which is varied by the diver's breathing, the diaphragm controls, via a control member, a valve having a fixed portion and a movable portion. A pressure chamber is provided in which a reduction in pressure is produced through a channel opening out into the flow of gaseous mixture into the valve at right angles to the direction of that flow. The opening of the valve is assisted and accelerated by this reduction in pressure in order to facilitate the diver's breathing.

1 Claim, 2 Drawing Figures

PRESSURE REGULATOR FOR BREATHING APPARATUS

This invention relates to a pressure regulator for breathing apparatus having a source containing a gaseous mixture, the regulator comprising a diaphragm case having an interior space, a diaphragm disposed in the diaphragm case, a valve housing, a movable valve body disposed in the valve housing for opening and closing the regulator, and a control member for moving the valve body as a function of the position of the diaphragm with respect to the diaphragm case, the valve housing being divided by the valve body, when the regulator is closed thereby, into two or more chambers, a first chamber being adapted to communicate with the gaseous-mixture source and a second chamber communicating with the interior space of the diaphragm case.

Pressure regulators of this kind are already known for use in fireman's breathing apparatus and particularly for diving equipment. One such pressure regulator is described, for example, in the *Technical Manual for Scubapro Regulators* published by the Scubapro Division of Under Sea Industries, Inc., Compton, Calif. This known pressure regulator has an inlet for connecting the regulator to a tank containing a compressed gaseous mixture, an outlet for the gaseous mixture, a valve for opening and closing the passage between the inlet and the outlet, and a diaphragm which operates the valve via a lever against the retractile force of a valve spring. When the pressure at the outlet of the regulator becomes less than the ambient pressure, the diaphragm moves, and this movement is transmitted via the lever to the movable valve body in such a way that the valve opens. In this manner, fresh gaseous mixture then flows from the tank to the outlet of the regulator and to the user's mouth. As soon as the pressure at the outlet is once more approximately the same as the ambient pressure, the valve is again closed by the valve spring.

In the known pressure regulators, a relatively great amount of force is required to operate the valve because (a) in the design where the valve closes against the pressure, the flow of gas hinders the valve during the closing operation, and (b) in the design where the valve closes with the pressure, considerable force is necessary for opening it.

In order to keep the force required for operating the valve within acceptable limits, it has heretofore been customary in the case of the known pressure regulators to keep the effective zone of the valve small, i.e., to give it a small diameter; this, however, has meant that the cross-section of the gas-flow passage is small, which makes breathing more difficult.

It is an object of this invention to provide a pressure regulator of the kind initially described which substantially facilitates breathing as compared with the known regulators of this kind.

To this end, in the pressure regulator according to the present invention, the valve housing further comprises a third chamber and spaced first and second sealing surfaces, the valve body comprises spaced third and fourth sealing surfaces respectively cooperating with the first and second sealing surfaces for sealing off the third chamber from the second chamber when the regulator is closed by the valve body, the first and third sealing surfaces being operative between the first and second chambers, and the regulator further comprises a channel by which the third chamber communicates with the first chamber, this channel opening into the first chamber in the vicinity of the first and third sealing surfaces and at right angles to the direction of flow of the gaseous mixture in the first chamber for producing a lower pressure in the third chamber than exists in the first chamber when the gaseous mixture flows from the first chamber into the second chamber.

Figure 2:
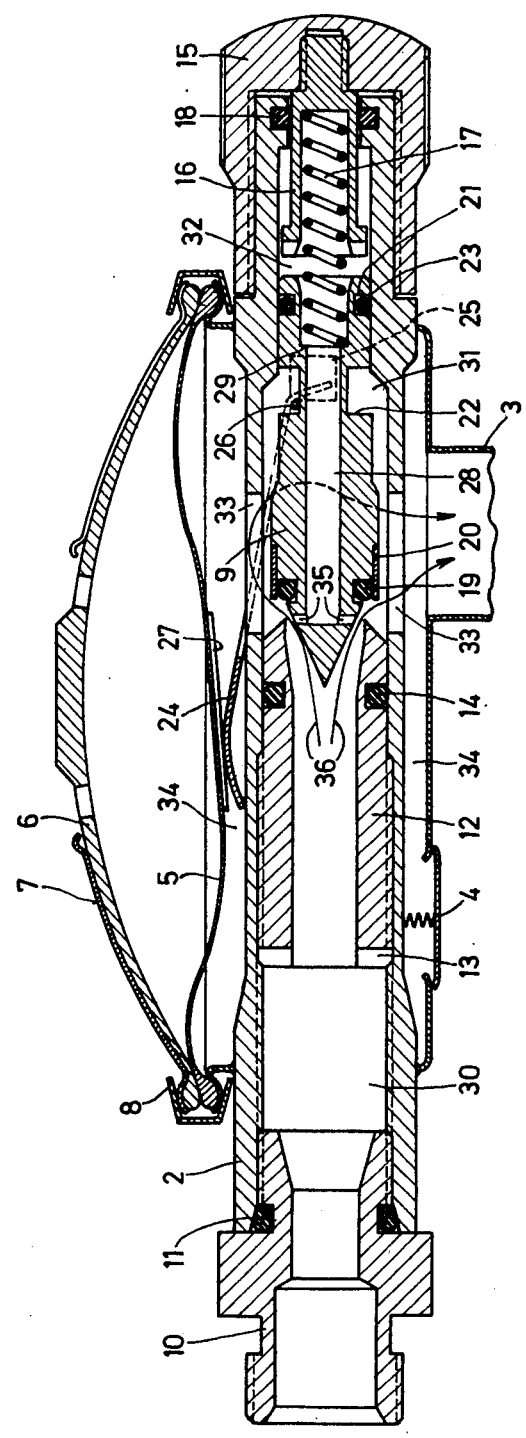

A preferred embodiment of the invention will now be described in detail with reference to the accompanying drawings, in which:

FIG. 1 is a longitudinal section through a pressure regulator according to this embodiment, showing its moving parts in the closed position, and FIG. 2 is a section similar to that of FIG. 1, but showing the moving parts of the pressure regulator in the open position.

The pressure regulator illustrated in FIGS. 1 and 2 is especially suitable for diving equipment but may equally well be used in breathing apparatus for firefighting or air-raid defense applications. Identical parts are designated by identical reference numerals in both figures. The pressure regulator comprises a cup-shaped diaphragm case 1 through which a cylindrical valve housing 2 extends. At the bottom of case 1 is a tube 3 serving as an outlet for the gaseous mixture to be breathed, which can flow into the user's mouth through a hose (not shown) or a mouthpiece (not shown) attached to tube 3. Also situated at the bottom of case 1 is an exhaust valve 4 for exhausting exhaled breath from case 1; valve 4 opens when the pressure within case 1 is greater by a predetermined amount than the outside pressure surrounding the pressure regulator. The open top of case 1 is closed off by a resilient diaphragm 5, preferably made of rubber. The delicate diaphragm 5 is protected against mechanical damage by a cover 6 disposed on the outside thereof and by a cover-ring 7. The edges of diaphragm 5, cover 6, and cover-ring 7 are clamped to the outwardly-flanged rim of case 1 by means of a clamp-ring 8 so that case 1 is tightly sealed.

Screwed into the end of valve housing 2 shown at the left of the drawings is a connection piece 10 which is connected via a hose 37, indicated by a dash-line in FIG. 1, to a tank 38 containing a gaseous mixture. An O-ring 11 ensures that the screw-connection between connection piece 10 and valve housing 2 is fluid-tight. Screwed into the same internal thread of valve housing 2 as connection piece 10 is a sleeve 12 having a valve seat at the end thereof remote from connection piece 10. To facilitate screwing sleeve 12 into valve housing 2, there is a transverse slot 13 at the other end of sleeve 12, so that the position of sleeve 12 relative to valve housing 2 can easily be adjusted by means of a screwdriver. Encircling sleeve 12 is a groove for receiving an O-ring 14.

The end of valve housing 2 remote from connection piece 10 is provided with an external thread on which an adjustment knob 15 is screwed. Knob 15 comprises an axially-disposed middle piece 16 having a blind bore for guiding a pressure spring 17. An O-ring 18 is disposed between the inside wall of valve housing 2 and the outer surface of middle piece 16.

Inside valve housing 2, between sleeve 12 and middle piece 16 of adjustment knob 15, is a valve body 9 movable along the longitudinal axis of valve housing 2. The end of valve body 9 facing sleeve 12 is conical and is provided with a valve-seat ring 19 which cooperates with the valve seat of sleeve 12. Valve-seat ring 19 is secured to movable valve body 9 by a collet 20. The other end of valve body 9 is preferably somewhat smaller in diameter than the end bearing valve-seat ring 19. The smaller-diameter end of valve body 9 extends into a bore of valve housing 2 having a smaller inside diameter than the remainder of valve housing 2. Encircling the smaller-diameter end of valve body 9 are two spaced grooves 21 and 22. The narrower groove 21 serves to accommodate an O-ring 23, while the ends of a forked demand valve lever 24, each extending through a rectangular aperture 25 in the wall of valve housing 2, project into the wider groove 22. As already mentioned, lever 24 is forked, and it is pivotable about a pin 26 passing transversely through valve housing 2, with the bent ends of lever 24 resting against one of the sidewalls of groove 22. The other end of lever 24 is slightly curved and rests against a reinforcing plate 27 attached to diaphragm 5. Valve body 9 comprises a stepped blind bore 28, into the broader portion of which one end of spring 17 extends, resting against a shoulder 29 within blind bore 28, in order to press valve body 9, and more particularly valve-seat ring 19, against the valve seat, as shown in FIG. 1. The force with which valve-seat ring 19 is pressed against the valve seat of sleeve 12 can be very precisely adjusted by means of adjustment knob 15.

In the closed position illustrated in FIG. 1, the interior of valve housing 2 is divided by valve body 9 into essentially three chambers, viz., a chamber 30 communicating with connection piece 10, an annular chamber 31, and a pressure chamber 32 communicating with blind bore 28. Annular chamber 31 communicates with the interior 34 of case 1 via apertures 33 and also via the rectangular apertures 25 in valve housing 2. Furthermore, pressure chamber 32 communicates with chamber 30 via blind bore 28 and via openings 35 situated in the conical end of valve body 9, at right angles to the longitudinal axis thereof, in the vicinity of the valve seat.

In the position of valve body 9 described above, valve-seat ring 19 prevents communication between chamber 30 and the interior 34 of case 1. Part of the gaseous mixture flowing through connection piece 10 passes through openings 35 and blind bore 28 into pressure chamber 32, the effective pressure in chamber 30 being equal to that in pressure chamber 32. A force directed toward knob 15 is exerted upon the end of valve body 9 facing sleeve 12, which force is a function of both the pressure differential between chamber 30 and the interior 34 of case 1 and the operative surface area determined by the inside diameter of the valve seat. Acting upon the other end of valve body 9 is an oppositely-directed force which is a function of the aforementioned pressure differential and of the operative surface area determined by the diameter of the end of valve body 9 facing knob 15. When both of these operative areas are equal, the two opposing forces are consequently also equal and cancel each other out, i.e., valve body 9 can reciprocate effortlessly within valve housing 2, independently of the pressure differential between chamber 30 and the interior 34 of case 1. However, since a definite closure position is desired, valve body 9 is pressed toward sleeve 12 by the relatively weak pressure spring 17, so that valve-seat ring 19 rests against the valve seat. This arrangement also prevents valve-seat ring 19 from being lifted off the valve seat by a mere change of position of the pressure regulator and the force of gravity. An optimum adjustment can be achieved through the proper choice of the ratio between the sizes of the operative areas, i.e., between the respective diameters, and of the spring 17.

If, owing to the user's inhalation, the pressure in the interior 34 of case 1 now drops below that surrounding the regulator, diaphragm 5, together with reinforcing plate 27, moves toward valve housing 2, thus causing lever 24 to pivot counterclockwise, as viewed in FIG. 1, about pin 26. Valve body 9 is thereby moved toward knob 15 by the ends of forked lever 24 projecting into wider groove 22, so that valve-seat ring 19 is lifted off the valve seat of sleeve 12. This open position is illustrated in FIG. 2.

In order to facilitate breathing, it is essential that valve body 9 move into the open position as quickly as possible and afford the gaseous mixture a passage of large cross-section. This operation is assisted by the ingenious arrangement of openings 35. As soon as valve-seat ring 19 is lifted off the valve seat, a flow of the gaseous mixture as indicated by arrows 36 in FIG. 2 is produced, this flow reaching its peak velocity in the vicinity of the mouths of openings 35. Because openings 35 are disposed at right angles to the direction of flow, a suction effect is thereby created which causes a reduction of pressure within blind bore 28 and pressure chamber 32. This means that the force acting on valve body 9 in the direction of sleeve 12 decreases because the pressure in pressure chamber 32 drops, owing to the Venturi effect. However, the force acting upon valve body 9 in the opposite direction is virtually unchanged, so that as soon as the gaseous mixture begins to flow, valve body 9 moves into the open position.

As stated above, it is essential that the mouths of openings 35 be situated where the gaseous mixture flows at peak velocity. It is for this reason that sleeve 12 is designed so that its position with respect to valve housing 2 is adjustable. Furthermore, the conical shape of the end of valve body 9 facing sleeve 12 contributes decisively to the optimal attainment of the desired effect.

In the embodiment illustrated in FIGS. 1 and 2, pressure chamber 32 communicates with chamber 30 via blind bore 28 and openings 35. The same effect is also obtained if, instead of blind bore 28, at least one channel running axially within the wall of valve housing 2 is provided, which channel opens out at one end into chamber 30 or into the interior of sleeve 12 at right angles to the direction of flow of the gaseous mixture, e.g., at the location opposite openings 35, and at the other end directly into pressure chamber 32.

In the pressure regulator described above, the forces acting upon valve body 9 owing to the pressure differential between chamber 30 and the interior 34 of case 1 are substantially equalized; therefore, valve body 9 may be as large in diameter as possible, thus affording the gaseous mixture a passage considerably greater in cross-section compared with previously-known regulators, without the need for any increase in the amount of force required to operate valve body 9. On the contrary, this force is substantially less than in the prior art designs. This, in turn, makes it possible to use a diaphragm 5 and case 1 of smaller diameter. Hence the overall result is a pressure regulator which substantially facilitates breathing and takes up less space in the bargain.

Inasmuch as the opening operation of the valve formed by sleeve 12 and valve body 9 is assisted by the suction effect described above, valve body 9 need be moved only very little by diaphragm 5. Hence lever 24 may be replaced, for example, by a pin movable at right angles to the longitudinal axis of valve body 9, one end of the pin resting against reinforcing plate 27 and the other end cooperating with an inclined surface on valve body 9, so that when the pin, guided in a radial bore in valve housing 2, is moved inwardly, valve-seat ring 19 is lifted off the valve seat.

What is claimed is:

1. A pressure regulator for breathing apparatus comprising:
   a source containing a gaseous mixture;
   a diaphragm case having an interior space;
   a diaphragm disposed in said diaphragm case;
   a valve housing disposed in said diaphragm case;
   a movable valve body disposed in said valve housing and cooperable with a valve seat of said housing for opening and closing said regulator;
   a control member for moving said valve body as a function of the position of said diaphragm with respect to said diaphragm case;
   said valve housing being divided by said valve body, when said regulator is closed thereby, into a first chamber adapted to communicate with said gaseous mixture source, a second chamber communicating with said interior space of said diaphragm case, and a third chamber communicating with said first chamber;
   said valve housing additionally comprising spaced first and second sealing surfaces;
   said valve body comprising spaced third and fourth sealing surfaces respectively cooperating with said first and second sealing surfaces for sealing off said first chamber from said second chamber and said second chamber from said third chamber when said regulator is closed by said valve body;
   a conical portion of said valve body extending into said first chamber beyond said first and third sealing surfaces and the base portion of which has a diametrical extent substantially equal to that of said valve seat so as to cooperate therewith for producing a laminar flow of said gaseous mixture in the region of said first and third sealing surfaces when said regulator is opened by said valve body;
   a channel, by which said third chamber communicates with said first chamber, disposed in said valve body and opening into said first chamber, from said conical portion in the vicinity of said base portion of said conical portion and said first and third sealing surfaces, at right angles to the direction of flow of said gaseous mixture in said first chamber for producing a lower pressure in said third chamber than exists in said first chamber when said gaseous mixture flows from said first chamber into said second chamber; and
   the portion of said valve housing, which defines a part of said first chamber and which cooperates with said conical portion of said valve body, includes a portion tapering in the same direction as said conical portion of said valve body for additionally improving the laminar flow of said gaseous mixture in the region where said channel enters said first chamber.

* * * * *